United States Patent [19]

Johnson et al.

[11] 4,204,558

[45] May 27, 1980

[54] VALVE ASSEMBLY HAVING REMOTELY REPLACEABLE BEARINGS

[75] Inventors: Evan R. Johnson, San Diego; David E. Tanner, Poway, both of Calif.

[73] Assignee: The United States of America as represented by the United States Department of Energy, Washington, D.C.

[21] Appl. No.: 869,702

[22] Filed: Jan. 16, 1978

[51] Int. Cl.² ............................................. F16K 43/00
[52] U.S. Cl. ..................................... 137/315; 251/308; 308/72
[58] Field of Search ................. 137/315; 251/308, 305, 251/306; 308/72

[56] References Cited

U.S. PATENT DOCUMENTS

| | | | |
|---|---|---|---|
| 1,735,881 | 11/1929 | Seastedt | 308/72 |
| 3,171,429 | 3/1965 | Stümer et al. | 137/315 |
| 3,250,291 | 5/1966 | Roy | 251/306 |
| 3,314,336 | 4/1967 | Jorgji | 308/72 |
| 3,384,337 | 5/1968 | Brown | 137/315 |
| 3,697,042 | 10/1972 | Killian | 251/308 |
| 4,010,775 | 3/1977 | Roberts | 251/308 |
| 4,022,424 | 5/1977 | Davis et al. | 308/72 |

FOREIGN PATENT DOCUMENTS 1076353  10/1954  France ........................................ 308/72

Primary Examiner—Martin P. Schwadron
Assistant Examiner—G. L. Walton
Attorney, Agent, or Firm—R. V. Lupo; Roger S. Gaither; L. E. Carnahan

[57] ABSTRACT

A valve assembly having remotely replaceable bearings is disclosed wherein a valve disc is supported within a flow duct for rotation about a pair of axially aligned bearings, one of which is carried by a spindle received within a diametral bore in the valve disc, and the other of which is carried by a bearing support block releasably mounted on the duct circumferentially of an annular collar on the valve disc coaxial with its diametrical bore. The spindle and bearing support block are adapted for remote removal to facilitate servicing or replacement of the valve disc support bearings.

17 Claims, 5 Drawing Figures

VALVE ASSEMBLY HAVING REMOTELY REPLACEABLE BEARINGS

The present invention relates generally to flow control valve assemblies, and more particularly to a novel flow control valve assembly having remotely replaceable bearings which facilitate application of the valve assembly in locations where the valve is not readily accessible.

In many systems employing fluid flow ducts and control valves operable to control fluid flow through the ducts, it is desirable that the valves be serviceable from locations remote from the valves. For example, in some nuclear systems employing fluid flow ducts to carry the various working fluids and coolants, the flow control valves are difficult to inspect, maintain and replace because of their remote location and radioactivity. As a result, it is highly desirable that the valves be serviceable from locations remote from their immediate locations so as to provide suitable operator safety and prevent possible contamination of the system or surrounding environment. In such systems, the valves are generally operated or controlled through an actuator drive opening in the reactor vessel structure to facilitate operation from a position externally of the vessel structure.

In accordance with the known prior art control valves for use in nuclear systems, the entire valve assembly had to be removed from the system to inspect or replace the valve bearings. The attendant costs involved to service such known valve assemblies and the need for a valve assembly which facilitates remote manipulation for servicing or replacement of the valve bearings are readily apparent.

One of the primary objects of the present invention is to provide a novel valve assembly for use in a fluid flow duct which facilitates remote removal of the valve bearings for inspection, service or replacement of the bearings.

A more particular object of the present invention is to provide a novel valve assembly having a flow control valve disc rotatable within a fluid flow duct and supported on bearings which may be removed from the valve assembly from a location remote therefrom for servicing or replacement of the bearings whereafter reassembly of the bearings with the valve disc may be readily accomplished from the remote location.

A feature of the valve assembly in accordance with the present invention lies in the provision of novel bearing support means for supporting first and second bearings which rotatably support a valve disc within a fluid flow duct for controlling fluid flow through the duct, the bearing support means being selectively manipulatable by tools handled remotely from the valve assembly for removing, servicing or replacement, and reassembly of the valve bearings.

Further objects and advantages of the present invention, together with the organization and manner of operation thereof, will become apparent from the following detailed description of the invention when taken in conjunction with the accompanying drawings wherein like reference numerals designate like elements throughout the several views, and wherein.

Figure 1:
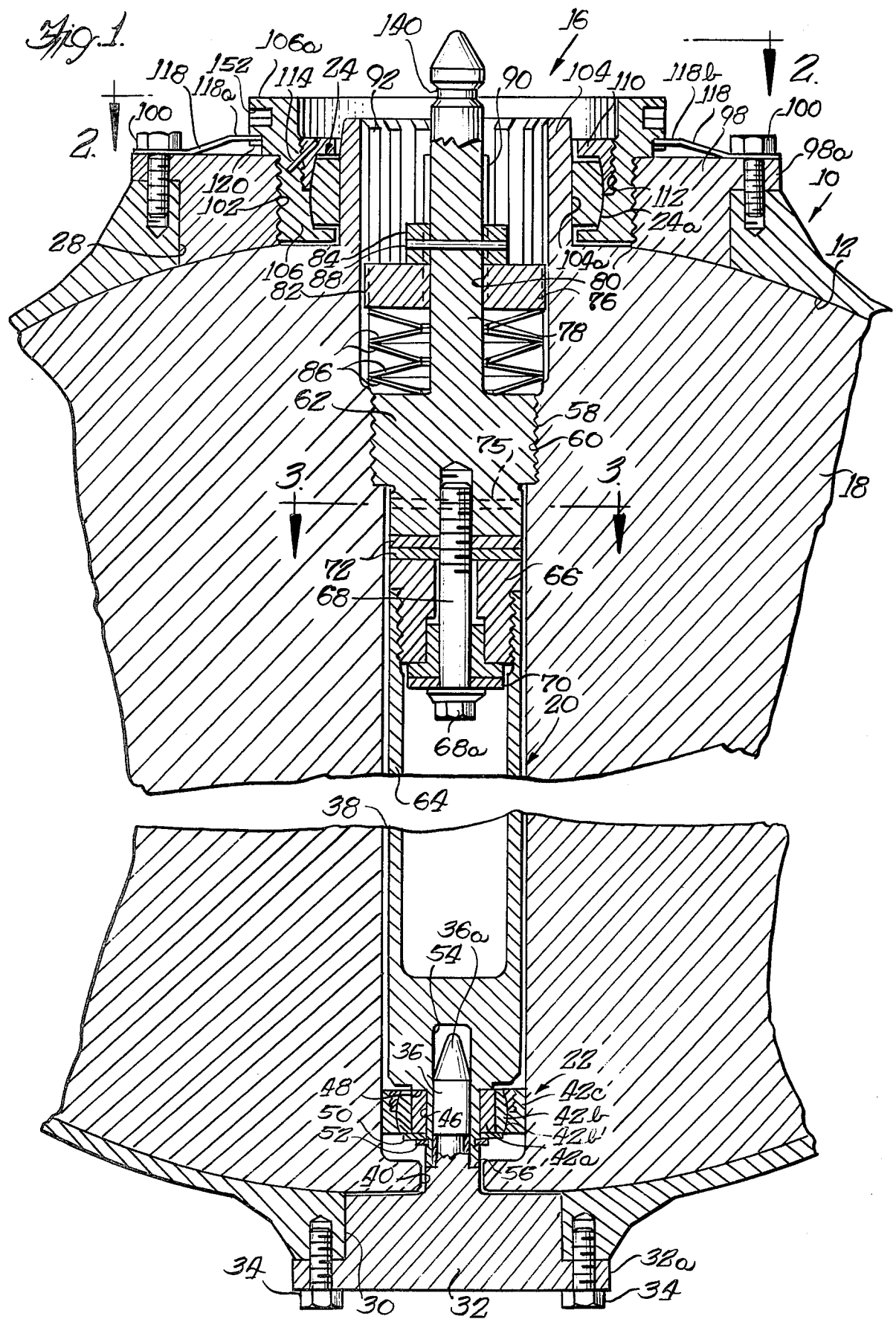
FIG. 1 is a fragmentary sectional view taken transversely through a flow duct a valve assembly associated therewith in accordance with the present invention.

Referring now to the drawings, and in particular to FIG 1, the present invention is illustrated as being embodied in housing means in the form of a tubular flow duct 10 which defines an internal flow passage 12 having, in the illustrated embodiment, a circular transverse cross section. A valve assembly constructed in accordance with the present invention is indicated generally at 16 and is supported by the flow duct 10 in operative association with the flow passage 12 so as to facilitate control of fluid flow through the flow duct. The valve assembly 16 includes a valve disc 18 disposed within the flow passage 12 and rotatable about the axis of a spindle 20 to control fluid flow through the flow passage, it being understood that the valve disc has a circular peripheral configuration and is adapted to prevent flow through the flow passage when the valve disc is positioned to lie in a plane transverse to the axis of the flow passage as illustrated in FIG. 1.

The valve assembly 16 includes first and second bearings, indicated generally at 22 and 24, respectively, which serve to support the valve disc 18 relative to the flow duct 10 for rotational movement about the axis of the spindle 20. In accordance with an important feature of the present invention, the bearings 22 and 24 comprise spherical bearings which are adapted to be removed from their cooperative relation with the valve disc 18 for inspection, repair or replacement, generally termed servicing, from a location remote from the valve assembly 16. By a "remote" location is meant a location spaced from the valve assembly 16 such as externally of an actuator drive opening in a vessel (not shown), such as a nuclear reactor vessel, in which the flow duct 10 and associated valve assembly are disposed. As will become more apparent hereinbelow, such an actuator drive opening facilitates access to the valve assembly 16 for normally operating the valve disc 18 to control fluid flow through the flow passage 12. The actuator drive opening for controlling movement of the valve disc also facilitates access to the valve assembly for removing the bearings 22 and 24 from their assembled relation with the valve disc 18 by tools inserted through the drive opening without entry of any portion of the operator into the reactor vessel.

The flow duct 10 has a pair of diametrically opposed and aligned circular openings 28 and 30 formed therein to intersect the flow passage 12. In the illustrated embodiment, the opening 30 receives a spindle support block 32 therein, the spindle support block being secured to the flow duct 10 through suitable means such as screws 34 received through mounting bores in a flange 32a on the spindle support block. The spindle support block 32 has a stub shaft 36 formed integral therewith such that the axis of the stub shaft is radial to the longitudinal axis of the flow passage 12 and passes through the opening 28 diametrically opposite the opening 30. The inner end of the stub shaft 36 is tapered at 36a to facilitate mounting of the spindle 20 thereon as will be described.

When in assembled relation with the valve disc 18, the stub shaft 36 extends coaxially into a diametral bore 38 in the valve disc. The bore 38 is stepped down to a reduced diameter opening at 40 so as to receive the stub shaft 36 therethrough in relatively closely spaced relation.

The bearing 22 is mounted on the spindle 20 and is normally received within the valve disc bore 38 to assist the upper bearing 24 in supporting the valve disc for rotation about the axis of the bore 38. In the illustrated embodiment, the spherical bearing 22 has an annular inner race 42a, an intermediate bearing 42b having an outer convex spherical surface 42b', and an outer race 42c having sliding contact with the bearing surface 42b'. The inner race 42a is mounted on a reduced diameter surface 46 of the spindle 20 and is retained against an annular shoulder surface 48 by an annular spacer 50 and a suitable retaining ring 52. The outer bearing race 42c is sized for snug sliding engagement with the lower end of the valve disc bore 38 when the spindle 20 is inserted downwardly within the bore 38, the stub shaft 36 being received within an axial bore 54 in the lower end of the spindle and defining an annular support shoulder 56 for engaging the lower end of the spindle in supporting relation therewith.

Figure 3:
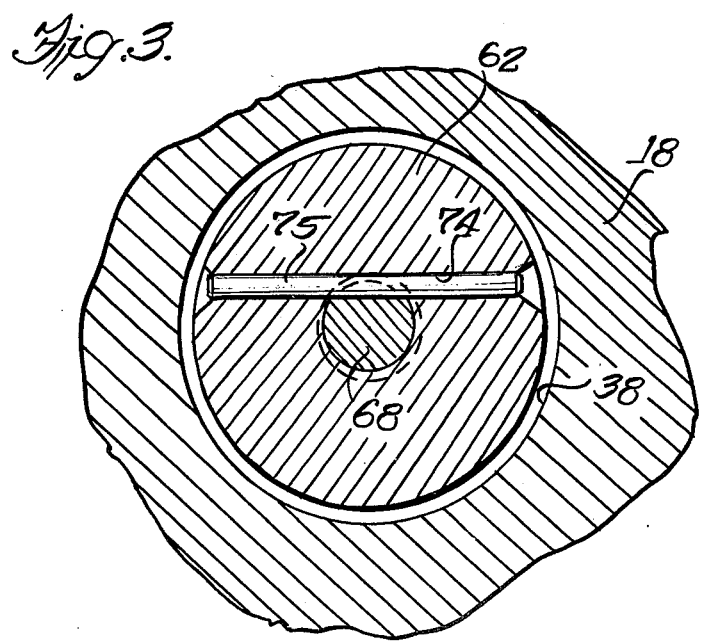
FIG. 3 is a fragmentary transverse sectional view taken substantially along the line 3—3 of FIG. 1, looking in the direction of the arrows.

It is seen from FIG. 1 that the lower end of the bore 38 within which the bearing 22 is received has the smallest diameter of the bore 38 so that axial movement of the spindle 20 outwardly from the open end of the bore 38 will effect a corresponding movement of the bearing 22 carried on the spindle. The spindle 20 is releasably secured to the valve disc 18 in supporting relation therewith through an external right-hand thread 58 formed on the spindle for threaded connection with a mating internal thread surface 60 in the bore 38. The external thread surface 58 is formed on an upper end portion 62 of the spindle which is connected to a lower tubular spindle portion 64 through a connecting block 66 having threaded connection with the tubular spindle portion 64. A connecting screw 68 passes through the connecting block 66 for threaded connection with the upper end portion 62 of the spindle. An annular thrust bearing 70 is interposed between the head 68a of screw 68 and a bearing block 71 seated within the connecting block 66. A pair of suitable annular thrust bearings 72 are interposed between the connecting block 66 and the upper end portion 62 of the spindle. As best seen in FIGS. 1 and 3, a transverse bore 74 is formed through the upper portion 62 of the spindle 20 to intersect the connecting screw 68 after which a retaining dowel 75 is inserted to retain the upper spindle portion 62 in assembled relation with the lower spindle portion 64.

In assembling the spindle 20 into the valve disc 18 after mounting the lower spherical bearing 22 onto the lower reduced diameter end surface 46 of the spindle, the spindle and associated bearing 22 are inserted into the valve disc bore 38 so that the stub shaft 36 is received upwardly within the bore 54. The thread surface 58 on the upper end 62 of the spindle is threaded into this threaded portion 60 of the valve disc bore until the lower end of the spindle abuts the support shoulder 56. The spindle is then threaded further into the threaded bore 60 to slightly lift the valve disc 18 on the spindle sufficiently to substantially center the valve disc within the flow passage 12. In this condition, the weight of the valve disc 18 and upper end 60 of the spindle are carried primarily by the lower spindle portion 64 through the thrust bearings 72. During rotation of the upper spindle portion 62 and associated valve disc 18, the lower spindle portion 64 remains relatively stationary on the stub shaft 36 so that the thrust washers 72 undergo relative rotation therebetween. An important feature of the present invention is that by removably mounting the spindle 20 within the valve disc 18, removal of the spindle to facilitate servicing or replacement of the bearing 22 also facilitates servicing or replacement of the thrust bearings 70 and 72.

To prevent unintentional rotation of the spindle 20 relative to the valve disc 18, an annular locking member 76 is carried on a reduced diameter upper end portion 78 of the spindle and is axially movable therealong. As best seen in FIG. 1, the annular locking member 76 has an internal axially splined bore 80 therethrough concentric with an outer spline surface 82 formed circumferentially of the locking member. The locking member 76 is axially movable along the reduced diameter end portion 78 of the spindle 20 between a first position wherein the locking member is biased against an annular stop member 84 by a plurality of bellville springs 86, and a second position spaced axially downwardly from the stop member 84 to which the locking member may be moved against the force of the bellville springs by a tool to be described hereinafter. The stop member 84 is fixedly secured on the spindle 20 by a dowel pin 88.

When the locking member 76 is in a position abutting the stop member 84, its inner spline surface 80 is in splined engagement with an external spline 90 on the end portion 78 of the spindle. The locking member 76 may be disengaged from the spline 90 by moving the locking member axially downwardly to a position below the spline 90. Throughout movement of the locking member 76 on the spindle 20, the outer spline surface 82 on the locking member is in splined engagement with an axially splined surface 92 formed internally of the uppermost end of the valve disc bore 38. Thus, when the locking member 76 is in a position abutting the stop member 84, rotation of the spindle 20 relative to the valve disc 18 is prevented. When the locking member 76 is moved downwardly clear of the spline 90, the spindle may be rotated relative to the valve disc to release the threaded area 58 from the internal thread 60 to facilitate removal of the spindle and bearing 22 from the valve disc. The spline surface 92 forms an actuator drive spline adapted for mating relation with an external spline surface on an actuator drive member (not shown) which may be inserted through the aforementioned actuator drive opening in a vessel in which the flow duct 10 and valve assembly 16 are housed for cooperation with the drive spline 92 to effect remotely controlled rotation of the valve disc 18.

To facilitate removal of the lower spherical bearing 22 without interfering with the upper spherical bearing 24, the upper bearing rotatably supports the upper end of the valve disc 18 at a diameter greater than the largest diameter of the bore 38 in the valve disc. To this end, a support member 98 is mounted within the circular opening 28 in the flow duct and is secured therein by screws 100 received through a flange 98a on the support member. The support member 98 has a threaded cylindrical bore 102 coaxial with and spaced radially outwardly from an upwardly extending annular collar wall 104 formed integrally on the valve disc 18, the inner surface of the collar wall defining a portion of the spline surface 92.

An annular bearing support block 106 is releasably threadedly mounted within the threaded bore 102 in the support member 98 and serves to support the upper spherical bearing 24. The bearing 24 has a cylindrical internal bore sized to snugly engage the outer pheripheral surface 104a of the collar 104 on the valve disc, and has an outer spherical surface 24a which slidingly engages a mating bearing surface 106a within the bearing support block 106. The bearing 24 is releasably retained in assembled relation with the support block 106 by a removable annular bearing retainer 110 having threaded engagement with a threaded counterbore 112 in the bearing support block. The bearing retainer 110 is maintained in predetermined relation to the bearing support block 106 through a locating and retaining pin 114.

Figure 2:
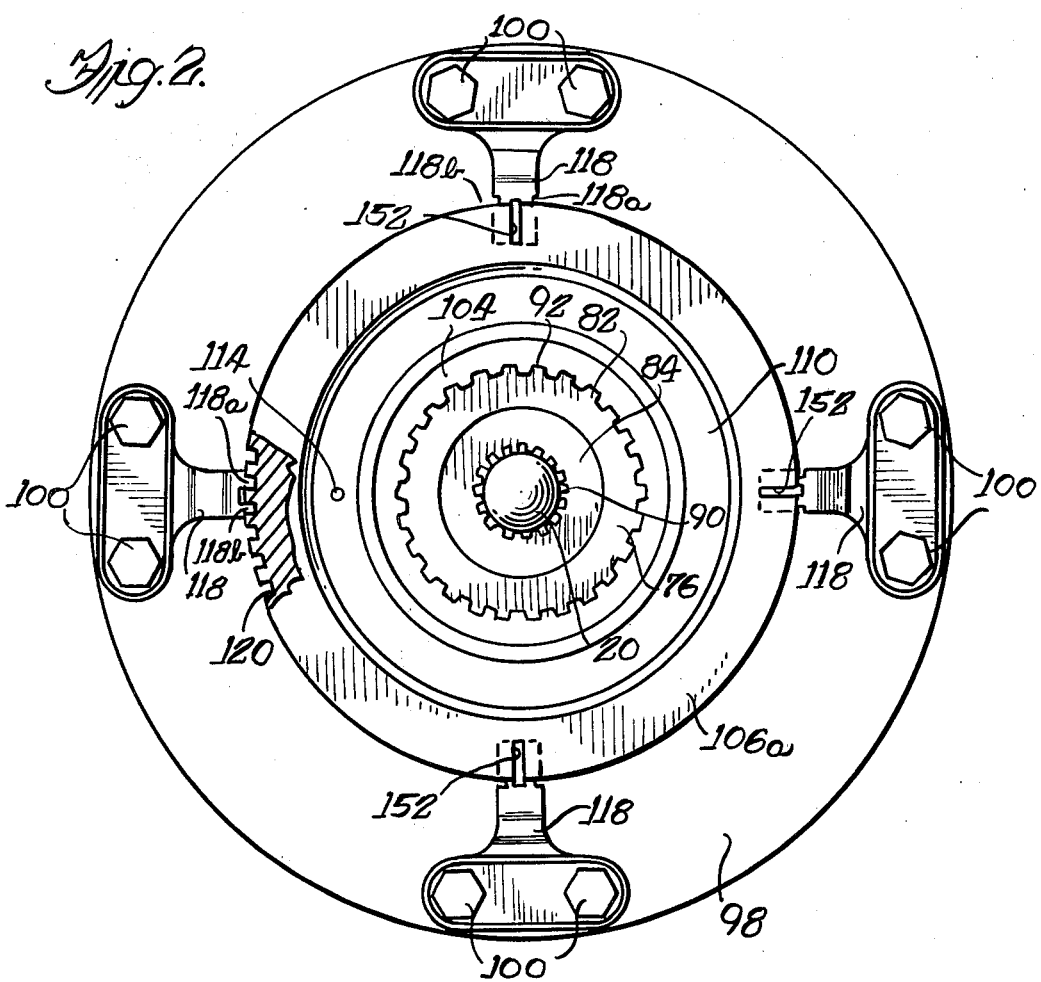
FIG. 2 is a top plan view of the valve assembly of FIG. 1, taken substantially along the line 2—2 of FIG. 1 looking in the direction of the arrows.

To lock the bearing support block 106 in assembled relation within the threaded bore 102 on the support member 98, a plurality of resilient locking springs 118 are secured to the upper surface of the support member 98 through screws 100, as best seen in FIG. 2. Although one locking spring 118 may suffice, the illustrated embodiment employs four locking springs spaced 90° about the support member 98. Each locking spring 118 is normally bent upwardly from the underlying surface of the support member 98 and has a pair of parallel spaced fingers 118a and 118b adapted to be received within suitably spaced notches 120 formed in and about the full circumferential edge of an upwardly extending annular portion 106a of the bearing support block 106. In this manner, when the bearing block 106 is assembled within the threaded bore 102, the locking fingers 118a, b are self-biased into the notches 120 to prevent rotation and release of the bearing support block unless the locking springs 118 are depressed to remove the locking fingers from the associated notches 120.

By employing spherical lower and upper bearings 22 and 24, these bearings more readily transmit axial loads during removal and replacement. Additionally, the spherical bearings 22 and 24 are able to accommodate angular misalignment between the rotational axis of the valve disc 18 and the spindle 20 or the bearing block 106 without binding.

As aforenoted, the valve assembly 16 is particularly suited for use in a flow duct which is confined within a vessel wherein the valve disc 18 is normally operated to control flow through the associated flow passage from a location remote from the valve assembly, such as through a suitable actuator opening in the vessel. In accordance with the present invention, the spherical bearings 22 and 24 and thrust bearings 70 and 72 may be disassembled from the valve disc 18 and flow duct 10 for servicing or replacement from the same remote location through which an actuator drive is normally inserted for engagement with the drive spline 92 to effect rotation of the valve disc 18 during normal usage.

Figure 4:
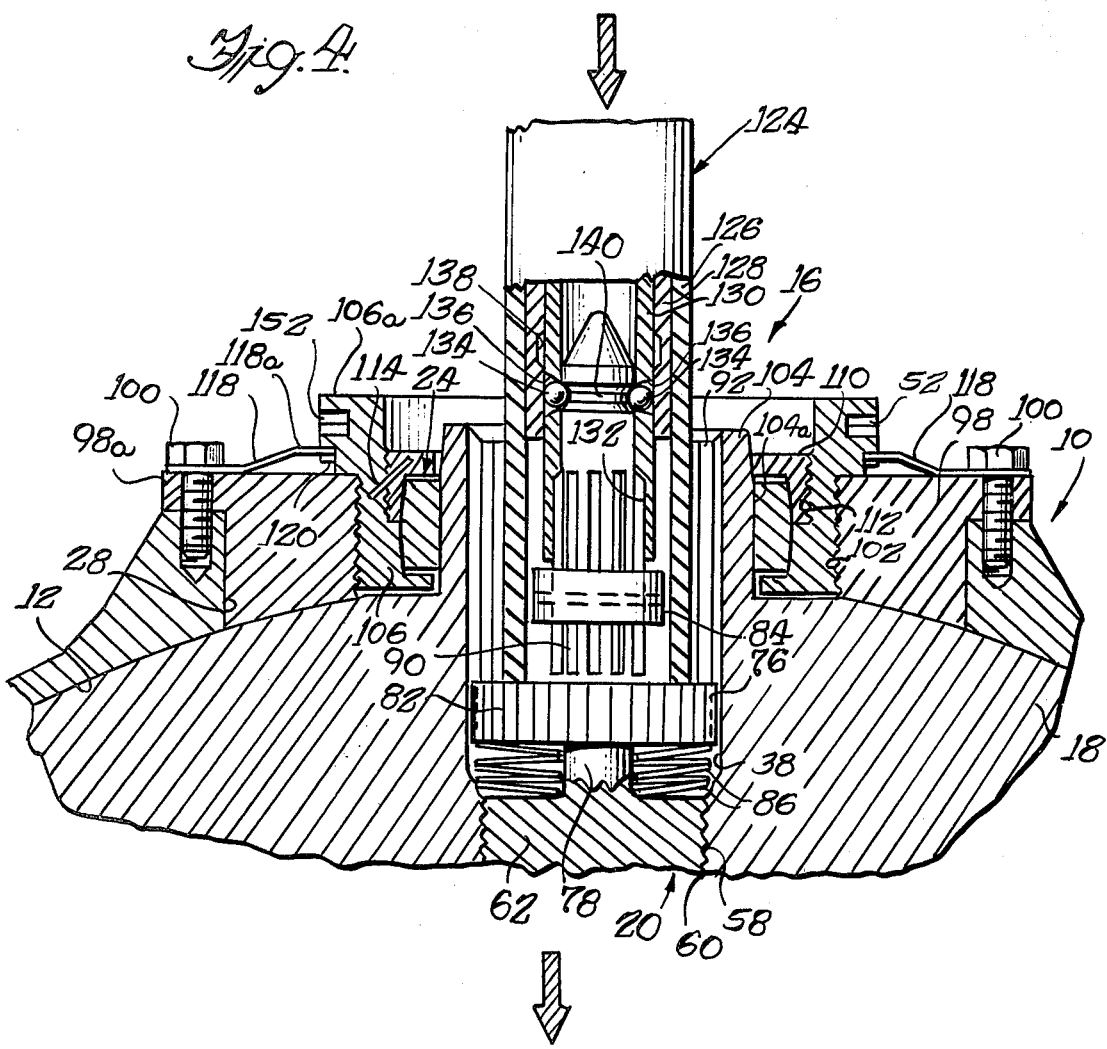
FIG. 4 is a fragmentary longitudinal sectional view of the mounting spindle of FIG. 1 having a tool for removing the spindle shown in operative association therewith.
Figure 5:
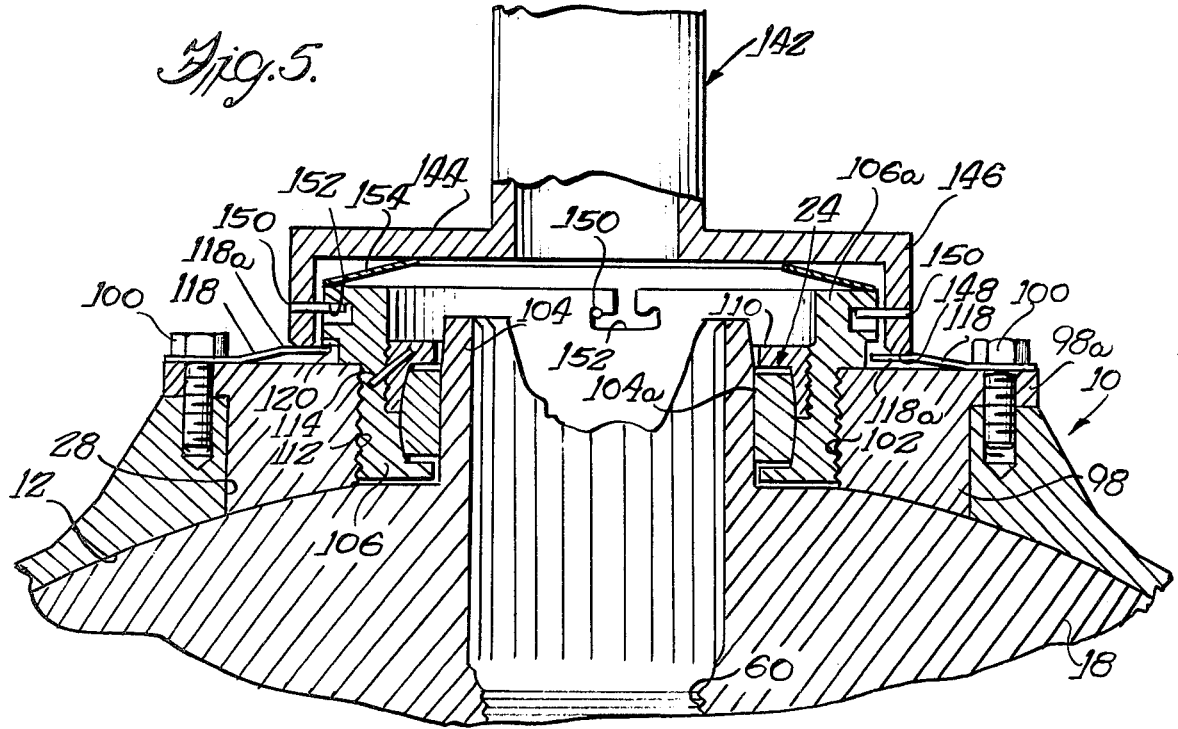
FIG. 5 is a fragmentary view showing a tool in operative association with the upper bearing support block for removing the upper journal bearing.

Such remote removal of the spherical bearings 22 and 24 and thrust bearings 70 and 72 may best be understood by reference to FIGS. 4 and 5. To remove the spindle 20 and associated lower bearing 22 and thrust bearings 70 and 72, the locking member 76 must first be disengaged from the spline 90 to allow rotation of the spindle for disengaging the mutually cooperable threads 58 and 60 on the spindle and valve disc 18, respectively. In the illustrated embodiment, release of the locking member 76 is effected by a tool, a portion of which is indicated generally at 124 in FIG. 4, having concentric outer, intermediate and inner sleeves 126, 128 and 130, respectively, which are mutually longitudinally slidable relative to each other. The outer sleeve 126 is adapted to be inserted downwardly within the splined surface 92 in the valve disc 18, and the inner sleeve 130 is adapted for downward telescoping movement over the upper end 78 of the spindle. The tool 124 has a longitudinal length sufficient to allow insertion through the aforementioned actuator drive opening (not shown) in the vessel in which the valve assembly 16 is located and manipulation to move the outer sleeve 126 downwardly over the spindle such that the lower end thereof engages the locking member 76 to move it downwardly to release it from th spline 90 whereafter the spindle may be rotated. Simultaneously with releasing the locking member 76 from the splined surface 90, the inner sleeve 130, which has an internal splined bore surface 132, is moved axially downwardly over the spline 90 on the spindle 20 so that rotation of the tool 124 about its longitudinal axis effects a corresponding rotation of the spindle 20 to disengage the threaded surfaces 58 and 60 and allow axial withdrawal of the spindle and lower bearing 22 from the valve disc.

To effect axial lifting of the spindle 20 from the valve disc 18, the inner sleeve 130 of the tool 124 carries a plurality of lifting balls 134 within frustoconical openings 136 spaced circumferentially about the inner sleeve in a plane transverse thereto. The balls 134 have diameters slightly greater than the radial thickness of the inner sleeve 130 and are normally partially received within an annular recess 138 formed in the intermediate sleeve 128 when the intermediate sleeve is moved to a position wherein the annular groove 138 is juxtaposed to the openings 136. The balls 134 and associated openings 136 are positioned on the inner sleeve 130 so that when the splined end 132 is received over the spline 90 on the upper spindle portion 76, the balls 134 are radially aligned with an annular groove 140 formed in the spindle 20 adjacent its upper end. Thereafter, upward axial movement of the intermediate sleeve 128 forces the balls 134 into the groove 140 whereafter the tool 124 may be raised to remove the spindle 20 and lower bearing 22 from the valve disc 18. Movement of the tool 124 and spindle 20 to the remote location from which the tool is manipulated facilitates inspection, servicing or replacement of the lower bearing 22 and thrust bearings 70 and 72.

FIG. 5 illustrates the manner in which the upper spherical bearing 24 may be remotely removed from the bearing assembly 16 for inspection, servicing or replacement. In the illustrated embodiment, removal of the bearing support block 106 may be accomplished by a tool, indicated generally at 142, which also may be inserted through the actuator drive access opening in the vessel (not shown) in which the flow duct and valve assembly are housed. The tool 142 has a lower end defined by a radial flange 144 integral with an annular wall 146. The annular wall 146 has a lower edge surface 148 adapted to engage the locking springs 118 to release the locking fingers 118a, b from their associated notches 120 in the bearing support block 106 when the tool 142 is moved downwardly over the bearing support block as shown in FIG. 5. The annular wall 46 supports a plurality of radially inwardly directed lift pins 150 which are adapted to be received within bayonet type inverted T-shaped slots 152 formed in the peripheral surface of the upper portion 106a of the bearing support block 106, as best seen in FIGS. 1 and 5. In the illustrated embodiment, four lift pins 150 are carried by the wall 146 of tool 142 and are adapted to be received within four equidistantly circumferentially spaced bayonet type slots 152 formed in the bearing support block when the tool 142 is moved downwardly over the bearing support block. A Belleville spring 154 is preferably suitably secured to the flange 144 to engage the upper surface of the bearing support block so as to bias the lift pins 150 against the upper retaining surfaces of the bayonet slots 152.

Manipulation of the tool 142 over the bearing support block 106 to depress the locking springs 118 and effect entry of the lift pins 150 into the respective bayonet slots 152 facilitates rotation of the bearing support block 106 to remove it from the support member 98 whereby the upper bearing 24 is removed from the annular collar 104 on the valve disc 18 for movement to a remote location for inspection, servicing or replacement.

Reassembly of the spindle 20 and lower bearing 22 within the bore 38 of the valve disc 18 is effected by reversing the procedure employed in removing it from the valve disc. Similarly, the upper bearing 24 is reassembled by reversing the steps employed in removing it from the valve assembly.

Having thus described a preferred embodiment of the valve assembly 16, it can be seen that a valve assembly is provided which is particularly suited for use in a location or environment in which close access to the valve assembly for purposes of inspection, servicing or replacement of the valve bearings is not readily possible. In accordance with the valve assembly 16, the spherical bearings 22 and 24, which rotatably support the valve disc 18 for rotation to control flow through the flow passage 12, may be readily disassembled from and reassembled onto the valve disc and associated flow duct from a location remote from the valve assembly through removal of the spindle 20 which carries the lower bearing 22 and removal of the upper bearing support block 106 which carries the upper journal bearing 108. Removal of the spindle 20 also facilitates replacement of the thrust bearings 70 and 72.

While a preferred embodiment of the present invention has been illustrated and described, it will be understood to those skilled in the art that changes and modifications may be made therein without departing from the invention in its broader aspects.

Various features of the invention are defined in the following claims.

What is claimed is:

1. A valve assembly adapted to be remotely disassembled for servicing of bearings, comprising, in combination, a fluid flow duct defining a flow passage and having an opening intersecting said flow passage, a valve disc disposed within said flow passage and having a diametral bore therethrough defining an axis of rotation, a spindle releasably mounted in said bore and having a first end portion adapted to be rotatably supported, means operatively associated with said flow duct and said first end portion of said spindle for supporting said spindle for rotation about its longitudinal axis, first bearing means carried on said first end portion of said spindle and cooperative with said valve disc, second bearing means, means releasably mounting said second bearing means on said flow duct for cooperative supporting relation with said valve disc, said first and second bearing means supporting said valve disc for rotation about its axis of rotation relative to said flow duct, said spindle having a second end portion accessible through said opening, and means releasably interconnecting said spindle to said valve disc so as to facilitate withdrawal of said spindle and said first bearing means from said valve disc and through said opening without removing said valve disc for servicing said first bearing means, said means releasably mounting said second bearing means being adapted for remote manipulation to facilitate removal of said second bearing means from said flow duct and valve disc for servicing of said second bearing means.

2. A valve assembly as defined in claim 1 wherein said spindle is threadedly cooperative with said valve disc to maintain said spindle in predetermined axial position within said bore, said means releasably interconnecting said spindle to said valve disc including a locking member having cooperation with said spindle and said valve disc and movable between a first position preventing rotation of said spindle about its longitudinal axis relative to said valve disc and a second position facilitating rotation of said spindle whereby to release said spindle from said valve disc for removal from said bore.

3. A bearing assembly as defined in claim 2 including means biasing said locking member to its said first position.

4. A valve assembly as defined in claim 2 wherein said second end portion of said spindle has an external longitudinal spline thereon, said valve disc bore having an internal longitudinally extending spline disposed circumferentially of said second end of said spindle when mounted in said bore, said locking member having splined connection with both said spindle and valve disc when in said first position and being released from said spline connection with said spindle when in said second position.

5. A valve assembly as defined in claim 4 including stop means carried by said spindle adjacent said spline thereon, and means biasing said locking member against said stop means when in said first position, said locking member being movable to said second position by a predetermined force applied thereagainst in a direction to move said locking member axially along said spindle to its said second position.

6. A valve assembly as defined in claim 1 wherein said first bearing means comprises a journal bearing carried on said spindle in fixed axial relation thereon, said journal bearing having engagement with said valve disc internally of said bore therein and being longitudinally movable along said bore during removal of said spindle therefrom.

7. A valve assembly as defined in claim 5 wherein said spline on said spindle and said spline within said valve disc bore are spaced radially apart sufficiently to receive an annular tool therebetween for effecting movement of said locking member from its said first to its said second positions.

8. The valve assembly as defined in claim 5 wherein said spindle has detent means formed thereon axially outwardly from said spline thereon to facilitate grasping of said spindle and axial withdrawal thereof outwardly from said bore after release of said spindle from said valve disc.

9. A valve assembly as defined in claim 1 wherein said second bearing means includes a bearing support block releasably mounted within said opening in said flow duct, and an annular bearing carried by said bearing support block and cooperative with said valve disc to facilitate rotation thereof about the axis of said bore, and including locking means mounted on said flow duct and releasably cooperable with said bearing support block to prevent removal thereof from said flow duct.

10. A valve assembly as defined in claim 9 wherein said bearing support block has a plurality of locking recesses formed circumferentially thereabout, said locking means including at least one locking finger normally biased into locking engagement with at least one of said locking recesses when said bearing support block is mounted on said flow duct, said locking finger being movable to a position released from said locking recess to facilitate removal of said bearing support block.

11. A valve assembly as defined in claim 9 wherein said bearing support block has at least one bayonet slot formed in its exterior surface for cooperation with a tool having means thereon for engagement with said bayonet slot for effecting removal of said bearing support block from said flow duct.

12. A valve assembly as defined in claim 1 wherein said means associated with said flow duct and said first end portion of said spindle for supporting said spindle includes a stub shaft supported by said flow duct so as to extend radially into said flow passage, said first end portion of said spindle having an axial bore therein adapted to receive said stub shaft therein in a manner to support said first end portion of said spindle.

13. A valve assembly as defined in claim 1 wherein said valve disc has an annular neck formed thereon coaxial with said bore and disposed adjacent said opening in said flow duct, said second bearing means having cooperation with said neck in supporting relation therewith.

14. A valve assembly as defined in claim 13 wherein said means releasably mounting said second bearing means comprises an annular bearing support block releasably mounted on said flow duct circumferentially of said second bearing means and in supporting relation therewith so that removal of said bearing support block from said flow duct removes said second bearing means from said cooperation with said neck for servicing of said second bearing means.

15. A valve assembly as defined in claim 13 wherein said second bearing means comprises an annular spherical bearing.

16. A valve assembly as defined in claim 1 wherein said first and second bearing means comprise spherical bearings.

17. A valve assembly as defined in claim 1 wherein said spindle includes first and second portions releasably connected in axially aligned relation and adapted for relative rotation therebetween, and including thrust bearing means interposed between said first and second portions and defining bearing surfaces which undergo said relative rotation, withdrawal of said spindle from said valve disc facilitating servicing of said thrust bearing means.

* * * * *